US011345253B2

(12) United States Patent
Li et al.

(10) Patent No.: US 11,345,253 B2
(45) Date of Patent: May 31, 2022

(54) VEHICLE POWER DEVICES, SYSTEMS, AND METHODS FOR FAIL OPERATIONAL ELECTRONIC CONTROL UNIT POWER MANAGEMENT

(71) Applicant: NIO USA, Inc., San Jose, CA (US)

(72) Inventors: Yiyong Li, Pleasanton, CA (US); Samir Agrawal, Milpitas, CA (US); Luna Chen, San Jose, CA (US)

(73) Assignee: NIO USA, Inc., San Jose, CA (US)

( * ) Notice: Subject to any disclaimer, the term of this patent is extended or adjusted under 35 U.S.C. 154(b) by 293 days.

(21) Appl. No.: 16/575,819

(22) Filed: Sep. 19, 2019

(65) Prior Publication Data

US 2021/0086655 A1 Mar. 25, 2021

(51) Int. Cl.
*B60L 58/10* (2019.01)
*H02J 9/06* (2006.01)
(Continued)

(52) U.S. Cl.
CPC .............. *B60L 58/10* (2019.02); *B60L 50/60* (2019.02); *H02J 9/06* (2013.01); *B60K 6/28* (2013.01); *B60R 16/0231* (2013.01); *B60Y 2200/91* (2013.01); *B60Y 2200/92* (2013.01); *B60Y 2400/112* (2013.01)

(58) Field of Classification Search
CPC .... B60L 58/10; B60L 50/60; B60L 2240/547; B60L 2250/16; B60L 3/0046; B60L 58/20; B60L 2260/32; B60L 3/0015; H02J 9/06; H02J 1/086; H02J 9/005; H02J 7/1423; H02J 7/0032; H02J 2310/48; H02J 9/061; B60Y 2400/112; B60Y 2200/91; B60Y 2200/92; B60K 6/28; B60R 16/0231; Y02T 10/70

See application file for complete search history.

(56) References Cited

U.S. PATENT DOCUMENTS 4,811,163 A * 3/1989 Fletcher .................. H02J 9/061
361/8
5,682,050 A * 10/1997 Williams ............ H01L 29/7806
257/368

(Continued)

FOREIGN PATENT DOCUMENTS

JP 2004/328988 11/2004

*Primary Examiner* — Jared Fureman
*Assistant Examiner* — Michael J Warmflash
(74) *Attorney, Agent, or Firm* — Sheridan Ross P.C.

(57) ABSTRACT

A power supply device for a vehicle that includes two or more independent power sources, a simple low-power voltage monitor connected to a fast switch device, an electronic control unit (ECU), and a dedicated standby monitor element. Each power source has a separate path to connect to the load(s). That is to say, a primary path connects the primary power source to the one or more loads, and a backup path connects the backup power source to the one or more loads. Furthermore, each path includes a back-to-back blocking element, which prevents a direct connection between the primary power source and the backup power source. At standby, both or all paths are blocked except the standby monitor, ensuring extremely low quiescent current. When the system is ON, the voltage level of the power system is monitored; if the voltage level drops below a threshold level, then the paths are switched.

20 Claims, 7 Drawing Sheets

(51) Int. Cl.
*B60L 50/60* (2019.01)
*B60K 6/28* (2007.10)
*B60R 16/023* (2006.01)

(56) References Cited

U.S. PATENT DOCUMENTS

| | | | | |
|---|---|---|---|---|
| 6,765,312 | B1* | 7/2004 | Rlass | H02J 7/1423 |
| | | | | 307/10.1 |
| 7,336,002 | B2* | 2/2008 | Kato | F02N 11/0866 |
| | | | | 307/10.6 |
| 9,755,454 | B1* | 9/2017 | Reynov | H02J 1/106 |
| 2008/0220932 | A1* | 9/2008 | Bosch | H02J 7/1423 |
| | | | | 477/3 |
| 2012/0056567 | A1* | 3/2012 | Savagian | B60L 50/61 |
| | | | | 318/400.3 |
| 2012/0074777 | A1* | 3/2012 | Sugiyama | B60L 8/003 |
| | | | | 307/22 |
| 2012/0123625 | A1 | 5/2012 | Ueo et al. | |
| 2013/0169038 | A1 | 7/2013 | King | |
| 2013/0326237 | A1* | 12/2013 | Holdengreber | H02J 9/061 |
| | | | | 713/300 |
| 2017/0088003 | A1 | 3/2017 | Yu et al. | |
| 2018/0191194 | A1 | 7/2018 | Nakano | |
| 2018/0208137 | A1* | 7/2018 | Yasunori | H01M 10/441 |
| 2021/0070191 | A1* | 3/2021 | Smith | B60L 3/003 |
| 2021/0070276 | A1* | 3/2021 | Smith | B60L 58/20 |

* cited by examiner

VEHICLE POWER DEVICES, SYSTEMS, AND METHODS FOR FAIL OPERATIONAL ELECTRONIC CONTROL UNIT POWER MANAGEMENT

FIELD

The present disclosure is generally directed to vehicle systems, and more particularly to vehicle power systems.

BACKGROUND

Most vehicles, particularly electric and hybrid vehicles, include power systems that monitor and control the operation of the batteries within the vehicles. For example, a power system of an electric vehicle controls the vehicle's powertrain as well as invertors or loads, such as heating and cooling components, dashboard electronics, etc. As the industry continues to develop, additional/alternative power systems are desired.

In automated vehicle applications, a failure of the primary power system may potentially lead to loss of control of the vehicle, resulting in accidents, or even loss of life. Therefore, for automated vehicle applications, it is desirable to provide fail operational power management.

DETAILED DESCRIPTION

Figure 1:
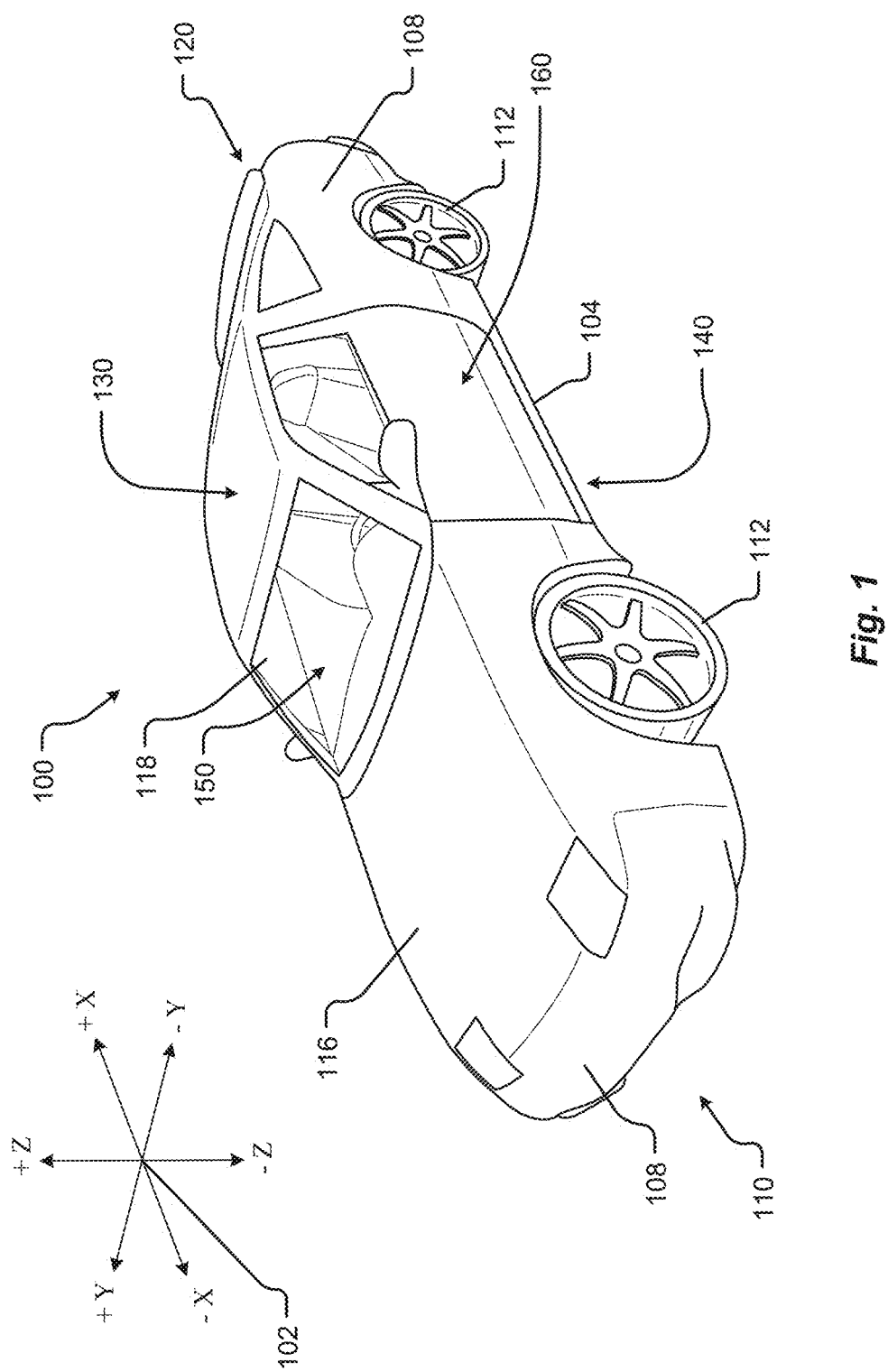
FIG. 1 shows a perspective view of a vehicle (or electric vehicle) in accordance with at least one example embodiment.

Embodiments of the present disclosure will be described in connection with a vehicle, and more particularly with respect to an automobile. However, for the avoidance of doubt, the present disclosure encompasses the use of the aspects described herein in vehicles other than automobiles; and further in aspects other than vehicles where two or more power sources are used. Furthermore, the present disclosure will be described in connection with power sources, such as batteries, but the disclosure is not so limited, and may encompass the use in any power source.

Embodiments of the present disclosure are directed towards providing stable operating power output through fail operational power management of dual independent inputs. For example, during a switchover from a path connected to a primary power source to a path connected to a backup power source, the two paths may be briefly connected, which may cause damage to either power source (i.e., primary and/or backup). Therefore, it is important to keep the two paths separate. In addition, if the switchover operation is not performed fast enough, the voltage on the load may see an excessive dip, which may result in a system brown-out. Therefore, the switchover must be fast. Further, control elements connected to the power sources may draw excessive current during system standby, draining the power source(s) which may result in shorter lifespans for those power source(s).

In some embodiments an electronic control unit (ECU) provides the fail operational power management. In some embodiments, the power system of vehicle 100 comprises at least two power sources working independently. That is to say, there is no direct connection between the power sources. The independent power sources provide a fail-safe operation, since the sources are never connected and are on two different/separate paths. For example, when the primary power source fails (e.g., fails to retain charge), in power systems where the backup source is connected to the primary source, the backup may be drained feeding the primary. Additionally, if the primary and backup power sources are connected in the same path, and the path fails, there is no alternative path to the backup power source.

In some embodiments, two pairs of blocking elements controlled by an electronic control unit (ECU), unblock/block the path to the primary/backup power source. When the controller detects that the primary power source has failed, the path to the primary power source is blocked and the path to the backup power source is unblocked. The two pairs of blocking elements prevent the two power sources from connecting directly. In some examples, the blocking elements comprise a forward blocking element and a reverse blocking element. In some embodiments, the blocking elements comprise back-to-back MOSFETs.

Embodiments of the present disclosure use a voltage sensor to determine whether the primary power source has failed. A simple switch device is directly connected to the voltage monitor to ensure fast switch over. For example, when the measured voltage is below a threshold value, the blocking elements will automatically switch to the "active" path without intervention of downstream ECU or software. In some embodiments, an indication will also be displayed when the paths are switched. For example, a warning signal may be displayed on an interface in vehicle 100. In some embodiments, the voltage sensor may be a Zener diode.

Embodiments of the present disclosure include a dedicated low current path to power a monitor Integrated Circuit (IC) in the ECU during standby mode. Advantageously, only a sub mA quiescent current is needed during standby mode to detect a transition from OFF mode to ON mode, which extends battery life. The dedicated standby path allows the power system and/or ECU to listen for an ON command while maintaining an ultra-low quiescent current during standby (e.g., when vehicle is in OFF mode).

Embodiments of the present disclosure may include a secondary control to allow for a system override. In some embodiments, the secondary control is implemented using software. In other embodiments, the secondary control may comprise a separate micro control unit (MCU). This secondary control may also be used to monitor the health of the power system and/or circuit.

FIG. 1 shows a perspective view of a vehicle (or electric vehicle) 100 in accordance with example embodiments. The vehicle 100 comprises a vehicle front 110, vehicle aft 120, vehicle roof 130, at least one vehicle side 160, a vehicle undercarriage 140, and a vehicle interior 150. The vehicle 100 may include a frame 104, one or more body panels 108 mounted or affixed thereto, and a windshield 118. The vehicle 100 may include one or more interior components (e.g., components inside an interior space 150, or user space, of a vehicle 100, etc.), exterior components (e.g., components outside of the interior space 150, or user space, of a vehicle 100, etc.), drive systems, controls systems, structural components, etc.

Coordinate system 102 is provided for added clarity in referencing relative locations in the vehicle 100. In this detailed description, an object is forward of another object or component if the object is located in the −X direction relative to the other object or component. Conversely, an object is rearward of another object or component if the object is located in the +X direction relative to the other object or component.

The vehicle 100 may be, by way of example only, a battery electric vehicle (BEV) or a hybrid electric vehicle (HEV). Where the vehicle 100 is BEV, the vehicle 100 may comprise one or more electric motors powered by electricity from an on-board battery pack. The electric motors may, for example, be mounted near or adjacent to an axis or axle of each wheel 112 of the vehicle. The battery pack may be mounted on the vehicle undercarriage 140. In such embodiments, the front compartment of the vehicle, referring to the space located under the vehicle hood 116, may be a storage or trunk space. Where the vehicle 100 is an HEV, the vehicle 100 may comprise the above described elements of a BEV with the addition of a gas-powered (or diesel-powered) engine and associated components in the front compartment (under the vehicle hood 116), which engine may be configured to drive either or both of the front wheels 112 and the rear wheels 112. In some embodiments where the vehicle 100 is an HEV, the gas-powered engine and associated components may be located in a rear compartment of the vehicle 100, leaving the front compartment available for storage or trunk space or for other uses. In some embodiments, the vehicle 100 may be, in addition to a BEV and an HEV, a fuel cell vehicle.

Although shown in the form of a car, it should be appreciated that the vehicle 100 described herein may include any conveyance or model of a conveyance, where the conveyance was designed for the purpose of moving one or more tangible objects, such as people, animals, cargo, and the like. Typical vehicles may include, but are in no way limited to, cars, trucks, motorcycles, buses, automobiles, trains, railed conveyances, boats, ships, marine conveyances, submarine conveyances, airplanes, space craft, flying machines, human-powered conveyances, and the like.

The vehicle 100 may be capable of autonomous operation, wherein one or more processors receive information from various sensors around the vehicle and use that information to control the speed and direction of the vehicle 100 so as to avoid hitting obstacles and to navigate safely from an origin to a destination. In such embodiments, a steering wheel is unnecessary, as the one or more processors, rather than a vehicle occupant, control the steering of the vehicle 100.

Figure 2A:
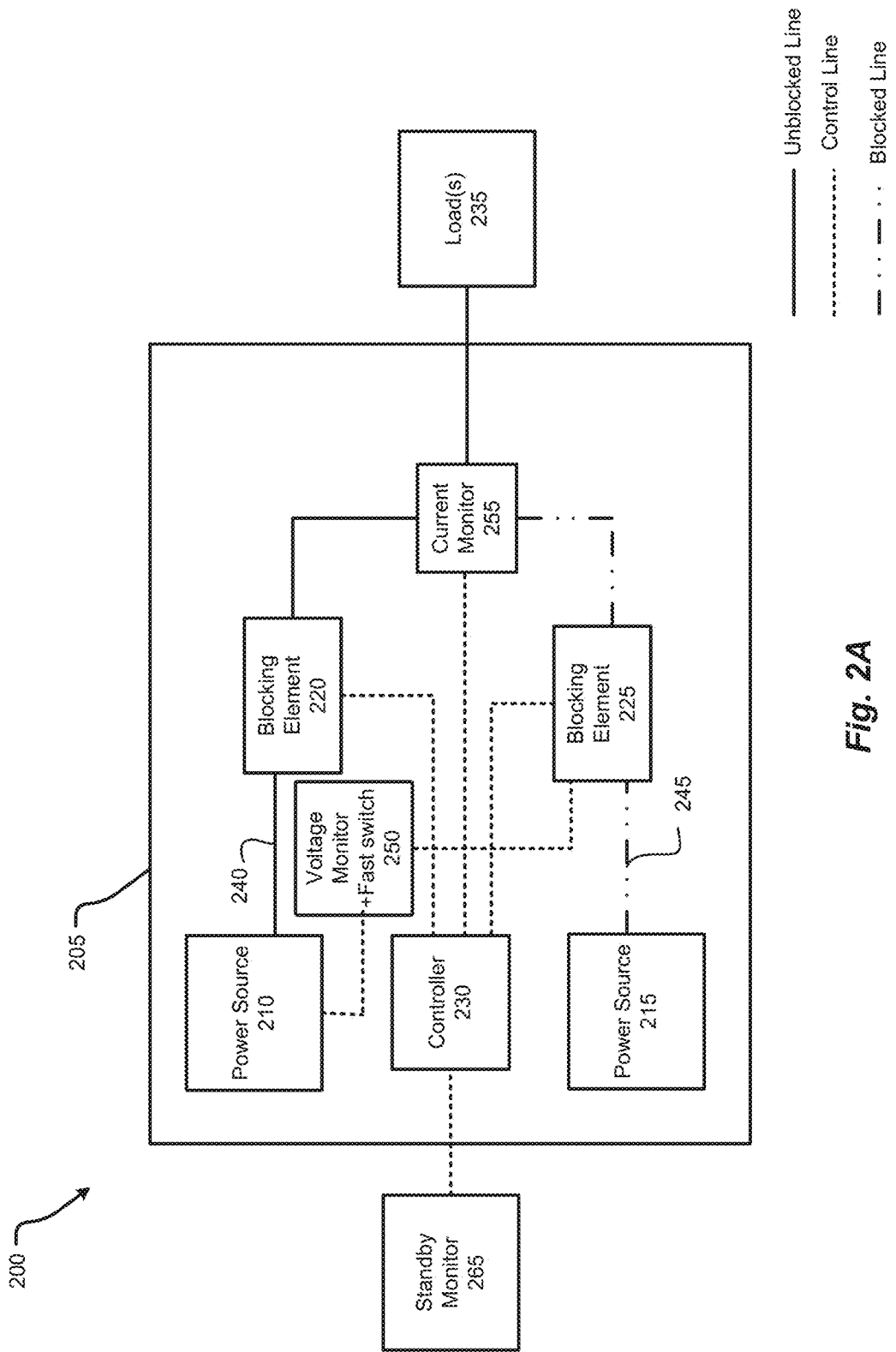
FIG. 2A is an example schematic of a power system of the vehicle in accordance with at least one example embodiment.

FIG. 2A is an example schematic of a power system 200 for the electric vehicle 100 in accordance with at least one example embodiment. The power system 200 includes a power supply device 205, standby monitor 265, and a load(s) 235. The power supply device 205 includes a power source 210, another power source 215, a first blocking element 220, a second blocking element 225, a voltage monitor/fast switch element 250, and a current monitor element 255. The voltage monitor 250 monitors the voltage of primary power source 210. The current monitor elements 255 monitors the current from path 240 or 245, depending on which path is unblocked. The power source 210 is connected to the load(s) 235 via path 240. The power source 215 is connected to the load(s) 235 via path 245. As shown in FIG. 2A the path 240 connecting the power source 210 to the load(s) 235 is unblocked, indicated by the solid line; and the path 245 connecting the power source 215 to the load(s) 235 is blocked, indicated by the dotted line. Additionally, there are control lines (i.e., dashed lines) between secondary controller 230 and blocking elements 220/225 and monitor element 255. In some embodiments, the power source 210 comprises a primary power source; and the power source 215 comprises a backup power source. The power supply device 205 may be an uninterruptable power supply (UPS) device for providing an uninterrupted supply of power to the load(s) 235, for example. The UPS device may have various operating modes, described in more detail below with reference to FIGS. 4-6.

The power sources 210 and 215 may include one or more rechargeable batteries or rechargeable battery cells that store electrical energy. The power sources 210/215 may include one or more rechargeable battery packs (e.g., 400V, 800V, etc.) that power a drivetrain of the vehicle 100 to cause movement of the vehicle 100. In some embodiments, the power system 205 may also include a low voltage power source, such as a rechargeable 12V battery, to power critical loads on a low voltage power network. Some examples of critical loads include safety critical systems such as autonomy sensors, (i.e., ultrasonic, camera, radar, lidar, etc.) autonomy computing systems, battery management systems, vehicle controllers, steering systems, brake systems, vehicle state sensors, propulsion systems etc.

In general, the power sources 210 and 215 provide power to the load(s) 235 during normal vehicle operation. That is, the power source 210 is usually connected to the load(s) 235 and may be disconnected from the load(s) 235 in the event of a failure condition. In this case, the power source 215 may act as a backup power and may continue to provide power to the load(s) 235 in the event of a failure of the power source 210, thereby providing an uninterrupted power supply to the load(s) 235.

Figure 3:
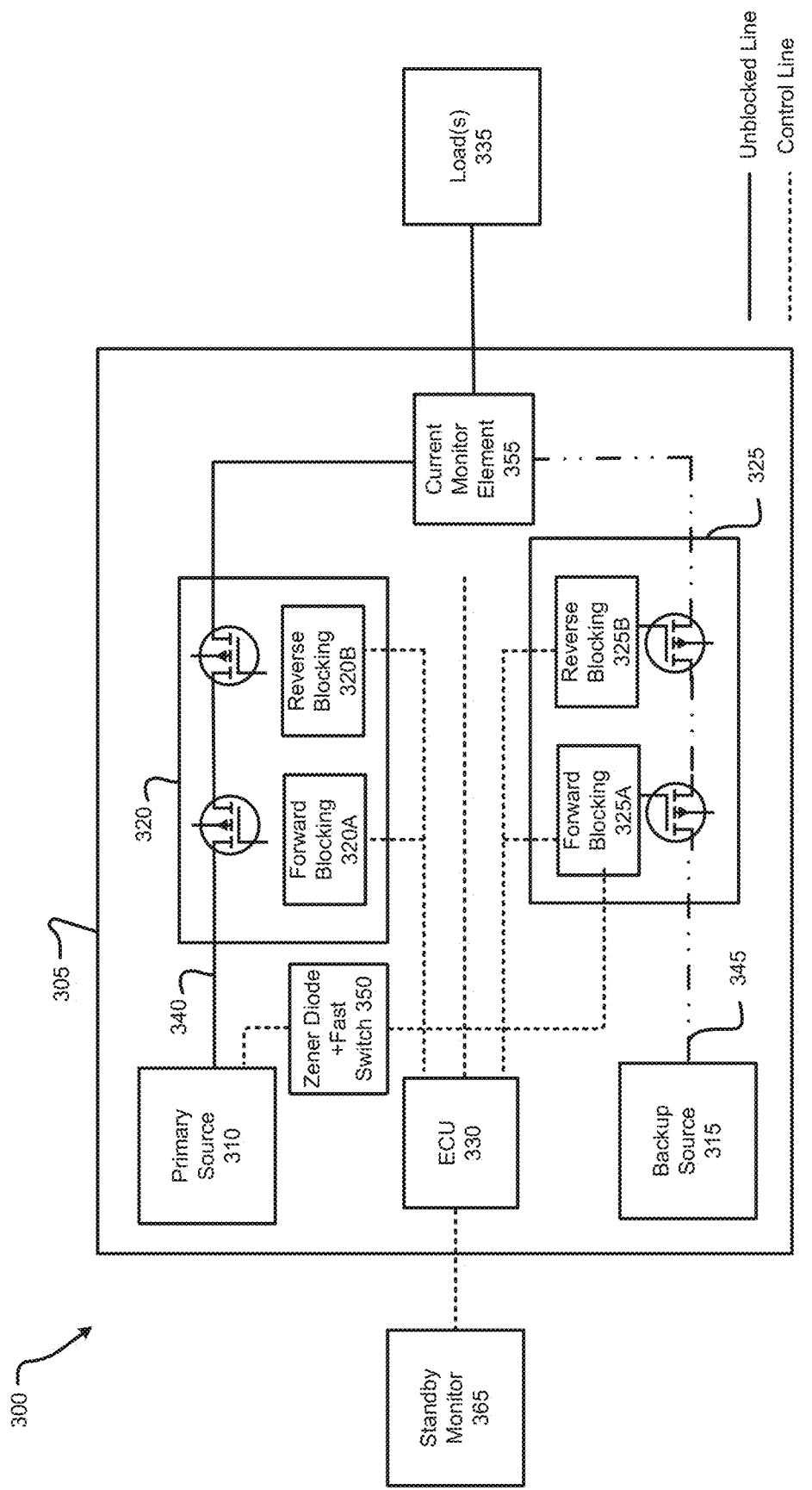
FIG. 3 is an example schematic of details of the power system of FIG. 2 in accordance with at least one example embodiment.

The blocking elements 220 and 225 each include one or more switches to control the flow of current between the power source 210 or the power source 215 and the load(s). FIG. 3 illustrates the blocking elements 220 and 225 in more detail.

The voltage monitor/fast switch element 250 may comprise a simple voltage reference (e.g. Zener diode) and a simple switch device to ensure quick unblocking of the backup source in case of the primary failure.

The secondary controller 230 may include hardware and/or software for controlling operation of the power supply device 205. For example, the controller 230 may include a processor (e.g., a microprocessor) coupled to a memory (e.g., a nonvolatile memory). The memory may include instructions that are executable by the processor to control the power supply device 205. Additionally, or alternatively, the controller 230 may include an application specific integrated circuit (ASIC) with logic elements that control the power supply device 205. The controller 230 may control the power supply device 205 to operate in various modes. In some examples, controller 230 comprises an electronic control unit (ECU). Operations of the controller 230 are discussed in more detail below with reference FIG. 4.

The load(s) 235 may include interior and/or exterior electronic components of the vehicle 100. The load(s) 235 may include one or more electronic components that are mandated or desired to have a continuous power supply even in the event of a failure of the power source 210 (e.g., drivetrain control, advanced driver assistance system (ADAS), headlights, tail lights, etc.). The load(s) 235 may also include one or more electronic components that are not necessarily desired to have a continuous power supply in the event of a failure of the power source 210 (e.g., radio controls, cabin lights, etc.).

The elements in FIG. 2A may be powered and controlled as shown by the solid line, dashed line, and dashed/dotted line. In FIG. 2A, the solid line is the unblocked path, the dashed line is a control line, and the dashed/dotted line is the blocked path. As shown in FIG. 2A, the power source 210 is connected to the loads 235. The path between the power source 215 and the loads 235 is blocked.

Figure 2B:
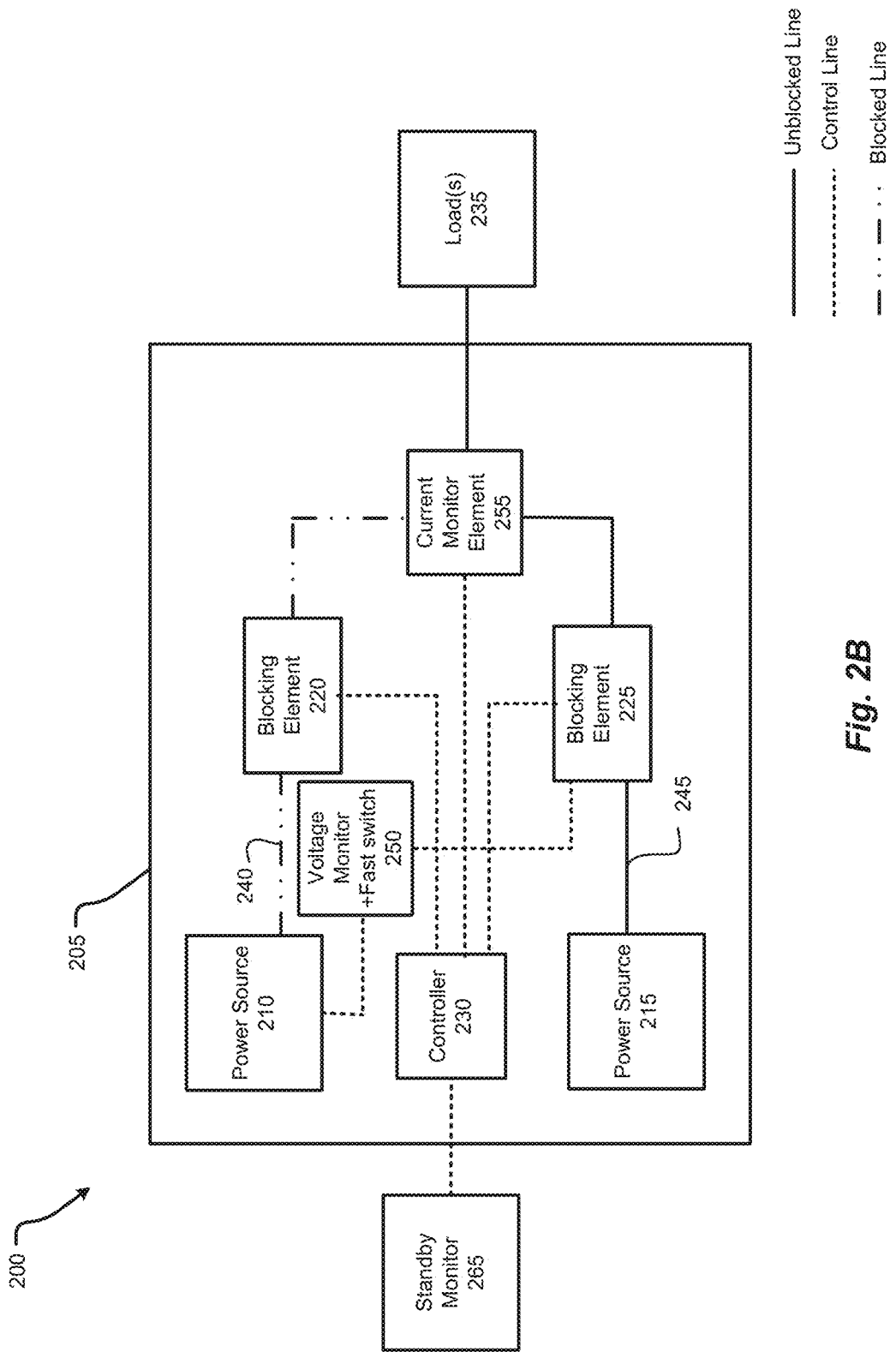
FIG. 2B is an example schematic of a power system of the vehicle in accordance with at least one example embodiment.

FIG. 2B is another example the power system 200 for the electric vehicle 100 in accordance with at least one example embodiment. As shown in FIG. 2B, the path 245 connecting the power source 215 to the load(s) 235 is unblocked and the path 240 connecting the power source 210 to the load(s) 235 is blocked. For example, monitor element 250 may detect that the power source 210 has failed, and through the attached fast switch, immediately unblocks the path 245 (solid line) while automatically blocking path 240 (dotted line). In the meantime, the secondary controller 230 also detects the status of power sources 210 and 215, and that of paths 240 and 245. It takes further actions at the system level (e.g., sending a warning message to the operator). Although shown as separate elements, it should be appreciated that the controller 230 and the monitor element 250 may be a single component.

FIG. 3 is an example schematic of the power system 200 from FIG. 2 with more detail in accordance with at least one example embodiment. As shown in FIG. 3, the blocking elements may include a set of back-to-back elements 320A/B and 325A/B. In some examples, the blocking element 320 may include a set of back-to-back blocking elements 320A and 320B. Likewise the blocking element 325 may include a set of back-to-back blocking elements 325A and 325B. The elements 320A and 325A may comprise forward blocking elements and elements 320B and 325B may comprise reverse blocking elements. Each set of back-to-back blocking elements may comprise solid state switches, such as MOSFETs, which can be embedded in a printed circuit board (PCB) of a power system or ECU. Advantageously, the solid-state switches allow for quicker switchover minimizing the occurrence of a brownout. In some examples, the switchover duration may be less than 200 uS. The configuration of the pair of back-to-back switching elements prevents a connection between the primary power source 310 and the backup power source 315. In other words, in the event of the failure of the primary power source 310, the path to the load(s) 335 will be switched so that the power source 315 will power the load(s) 335. In contrast, to other redundant systems, the backup power source may be used to charge the primary source. Additionally, the primary power source 310 and the backup power source 315 each have their own paths, paths 340 and 345, respectively, to the load(s) 335. Therefore, in the event of a failure of the path 340, the ECU 330 may switch to the path 345.

Although FIG. 3 illustrates the blocking elements as MOSFETS, it should be understood that example embodiments may employ the use of other types of switches if desired and/or any other type of switch useful for power electronic applications that can have a back-to-back configuration. Additionally, although the sequence of the blocking elements are shown as forward blocking elements 320A and 325A on the left and reverse blocking elements 320B and 325B on the right, it should be appreciated that the position or sequence of the blocking elements may be switched, that is to say forward blocking elements 320A and 325A on the right and reverse blocking elements 320B and 325B on the left.

Figure 4:
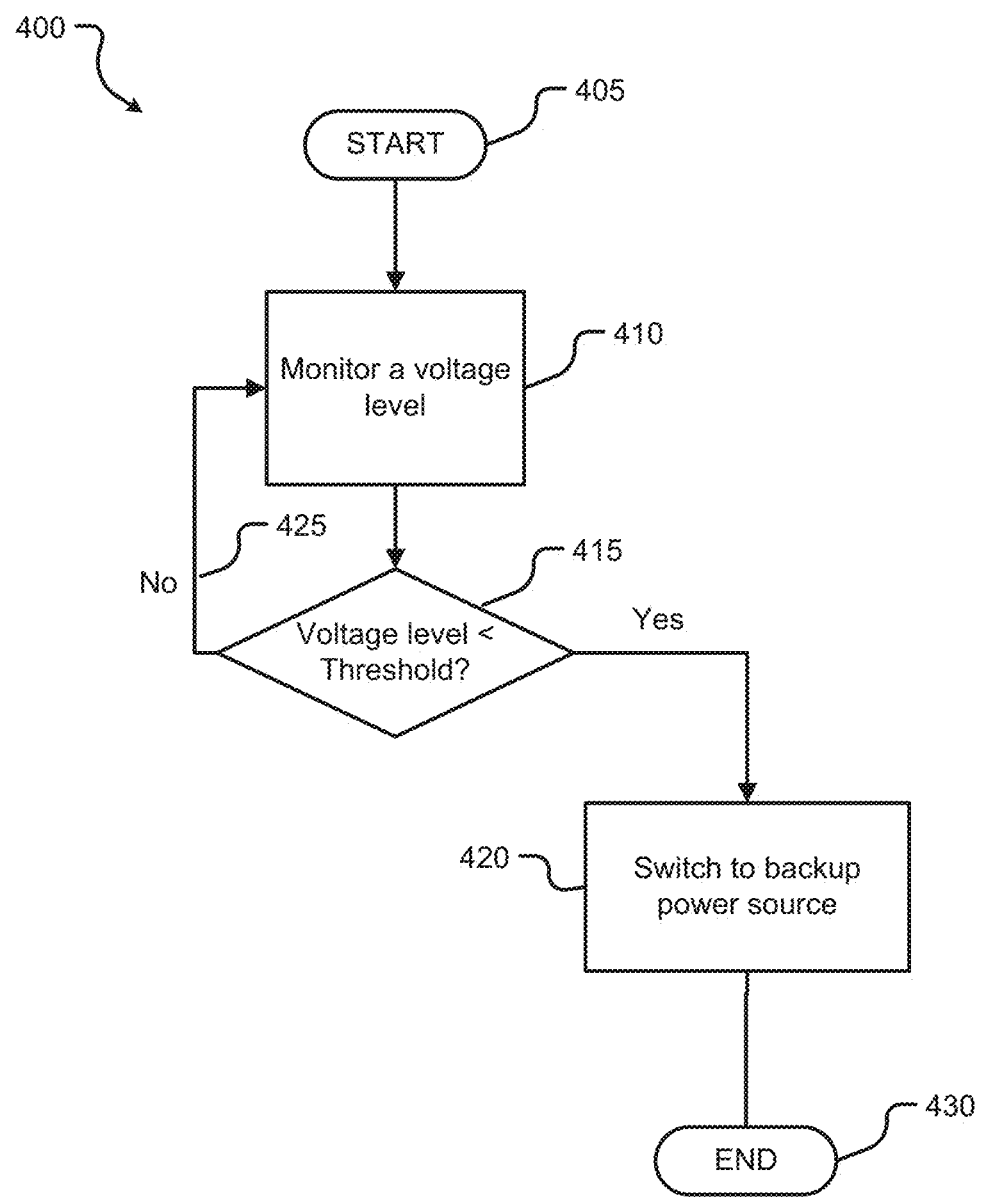
FIG. 4 is a flow diagram illustrating example operations of the system(s) in FIGS. 2-3 in accordance with at least one example embodiment.

FIG. 4 illustrates a method 400 according to at least one example embodiment. In more detail, FIG. 4 illustrates controlling the power supply device 205 to use different power sources and/or paths. For example, using the power source 210 via the path 240 and blocking the power source 215 via blocking the path 245, or vice versa.

While a general order for the steps of the method 400 is shown in FIG. 4, the method 400 can include more or fewer steps or can arrange the order of the steps differently than those shown in FIG. 4. Generally, the method 400 starts at operation 405 and ends at operation 430. The method 400 can be executed as a set of computer-executable instructions encoded or stored on a computer readable medium and executed by the controller 230 and/or ECU 330. Alternatively, the operations discussed with respect to FIG. 4 may be implemented by the various elements of the system(s) FIGS. 1-3. Hereinafter, the method 400 shall be explained with reference to the systems, components, assemblies, devices, user interfaces, environments, software, etc. described in conjunction with FIGS. 1-3.

In operation 410, the method 400 monitors a voltage level of the primary power source (e.g., the power source 210/310). According to at least one example embodiment, the voltage level is monitored while the vehicle 100 is in operation. The method 400 may monitor the voltage level using a Zener diode.

In operation 415, the method 400 determines whether the voltage level is above a threshold level. The threshold level may be a design parameter set based on empirical evidence and/or preference. In at least one example embodiment, the threshold level is a minimum desired operating voltage of the load(s) 235.

In operations 420 and 425, the method 400 controls switching of the at least one the blocking elements based on the voltage level. If the detected voltage level is below the threshold level, then to switch to the backup power source (i.e., connect the power source 215 to the load(s) 235 by unblocking the path 245 and disconnecting the power source 210 by blocking the path 240 (step 420). If the detected voltage level is above the threshold level, then continuing to monitor the voltage level of the circuit (step 425).

Here, it should be understood that example embodiments are not limited to performing the operations of FIG. 4 while the vehicle 100 is in operation but may, alternatively or additionally, be performed while the vehicle 100 is not in operation.

With reference to FIGS. 2-4, at least two blocking elements 220/225 and/or 320/325 includes a forward blocking element and a reverse blocking element. The blocking elements are individually controllable by the controller 230 or ECU 330.

In at least one example embodiment, the blocking element 220 is configured to be back-to-back with the blocking element 225. As shown in FIG. 3, the blocking element 320 includes a pair of blockings elements 320A/320B. Similarly, the blocking element 325 includes a pair or blocking elements 325A/325B. Further, the blocking element 320 is coupled between the primary power source 310 and the load(s) 335 and the blocking element 325 is coupled between the backup source 315 and the load(s) 335.

In view of FIGS. 2-4, it should be understood that at least one example embodiment is directed to a power system 200/300 for a vehicle 100. The power system 200/300 includes a power supply device 205/305 that powers the vehicle 100 with a first voltage (e.g., 400V, 800V, etc.) when the vehicle 100 is in operation (e.g., while moving). The voltage monitor/fast switch 250/350 controls the blocking elements 220/225/320/325 based on the detected voltage level; while controller 230/330 further backs up or overrides the control decision.

At least one example embodiment is directed to a method for a vehicle 100. The method includes monitoring a voltage level of a power source 210 of the vehicle 100 when the vehicle 100 is in operation and controlling switching of the power source from the power source 210 to the power source 215 if the voltage level goes below a threshold level.

Figure 5:
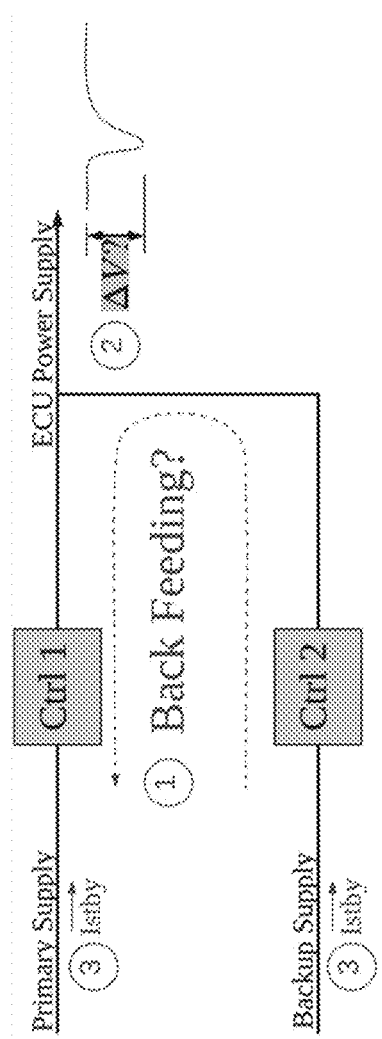
FIG. 5 is a schematic diagram of common implementation of dual power sources showing potential issues or drawbacks which this disclosure seeks to address.

FIG. 5 illustrates a schematic diagram of a dual power source system.

When two or more power sources are used for redundancy, one supply may be drained feeding the other. For example, if the primary power source goes bad (e.g., unable to retain charge), the backup source may be drained trying to charge the failed primary source. Compared to a traditional redundant power system, the power systems 200/300 illustrated in FIGS. 2-3 use double back-to-back blocking elements, which prevent a direct connection between the two power supplies. In other words, the backup power supply 315 cannot be used to charge/feed the primary power supply 310 and vice versa.

Additionally, in many dual power supply systems, there may be an excessive voltage drop at the output when the power source is switched from the primary power source 310 to the backup power source 315. The voltage drop may be due to the signal delay or slow turn-on of the power source 315, which may result in a brown out of the system 300. The blocking elements 220/225/320/325 comprise solid-state switches, such as MOSFETs, which can be embedded in a printed circuit board (PCB) of the power system 200/300. Advantageously, the solid-state switches allow for quicker switchover minimizing the occurrence of a brown out. The solid-state switches allow for a fast turn on time with almost no signal delay, thus a stable output is maintained with a minimal bulk capacitance. The Zener diode 350 is used as the voltage detector (e.g., the primary power source is bad/low). When the Zener diode 350 is conducting this indicates the primary power source 310 is at a valid level. When the Zener diode 350 is not conducting this indicates that the primary power source 310 is off/low, and the paths need to be switched. The use of the Zener diode 350 allows for quick automatic switching. Since there is no signal comparison, there is no signal delay.

In systems using redundant power supplies, a high quiescent current may be required to keep the circuit alive when the vehicle is in standby mode (e.g., vehicle is turned off), which may cause the battery to drain quickly. By using a standby monitor listening for an ON command, the paths to both the primary power source and the backup power source may be blocked, keeping the main power path off, resulting in only a small (sub mA) current needed during standby. This advantageously extends the battery life.

Figure 6:
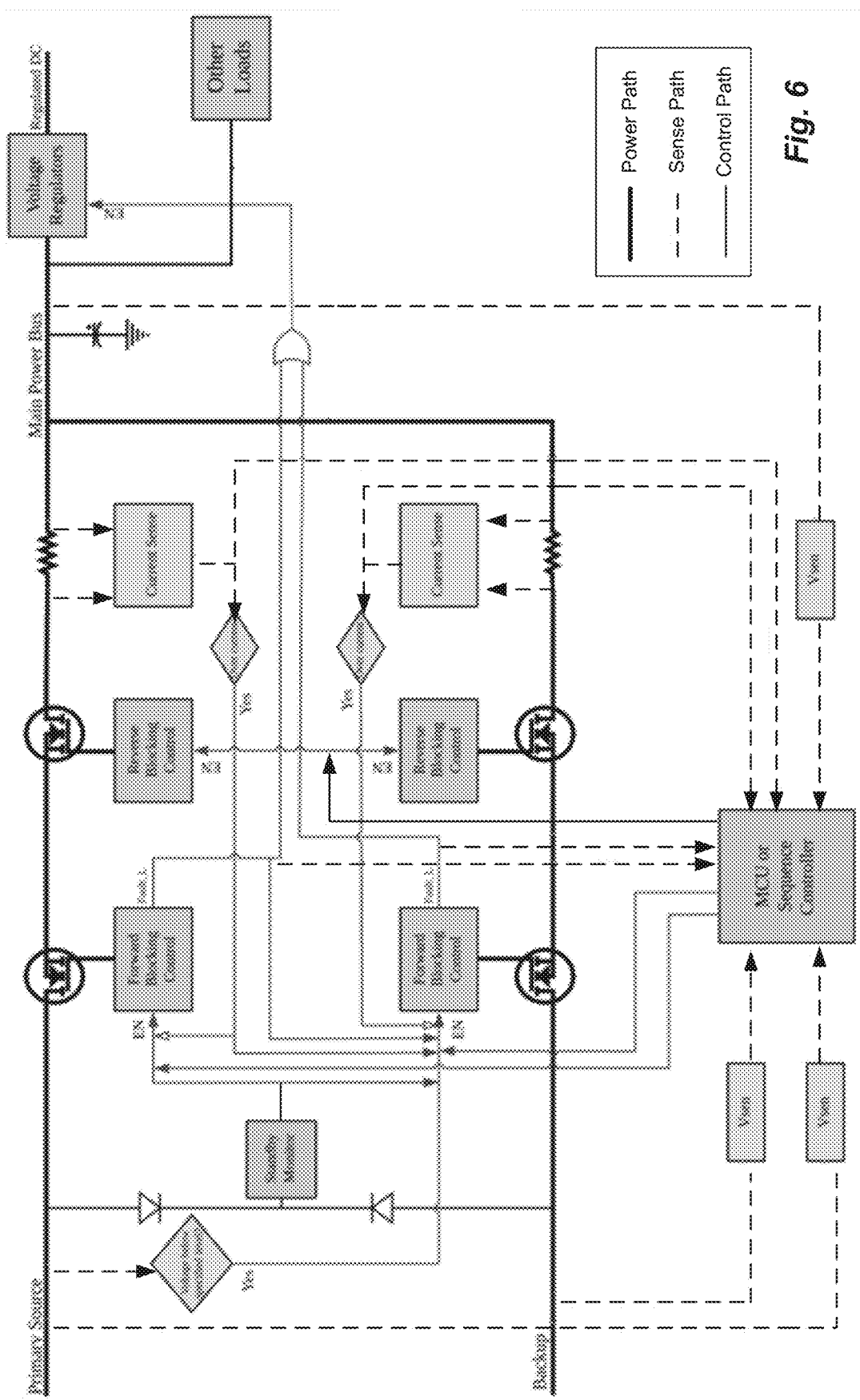
FIG. 6 is a schematic diagram of a fail operational power management system in accordance with at least one example embodiment.

FIG. 6 illustrates an example embodiment of the power systems 200/300. At standby, both paths are blocked by the forward blocking MOSFETs, while the standby monitor is listening for an external wakeup command; the quiescent current is the sum of the standby monitor bias and the leakage of the controllers and sense paths.

For example, when the vehicle 100 is in the OFF mode, the blocking elements 220/225/320/325 are blocked and the standby monitor is connected to vehicle system 200/300. A wakeup signal from the standby monitor unblocks the primary path (e.g., vehicle 100 is turned ON), while the backup path is still blocked if the voltage level of the primary power source 210/310 is in a valid range (i.e., above the threshold level). If the voltage level of the primary power source 210-310 drops below a threshold (specified range), the backup path is unblocked and the backup power source 215-315 will power the system 200/300; the primary path will be back biased by the reverse blocking MOSFET 320B. Even if the voltage level of the primary power source 210-310 is in a valid range, but the path between the primary power source 210/310 and the load(s) 235/335 is in fault/error, then the backup path will be unblocked to allow the backup power source 215/315 to take over powering the system 200/300 of vehicle 100. While the vehicle 100 is ON, the controller 230-330 will constantly monitor both inputs, so if the backup power source 215/315 becomes low, the system 200/300 can take the proper action (e.g., send a warning to the user). It should be appreciated that the position/sequence of the blocking elements may be switched. As illustrated in FIG. 6, the forward blocking elements are in the front followed by the reverse blocking elements, however, in some embodiments, the sequence/positioning of the blocking elements may be swapped. Additionally, in some embodiments, the reverse blocking elements will be positioned in the front, followed by the forward blocking elements.

In view of FIGS. 2-6, it should be understood that at least one example embodiment is directed to a power supply device 205 including a power source 210 having a first terminal. The power supply device 205 may include blocking elements 220/225. The power source 210 is coupled to the load(s) 235 via a path 240. The power source 215 is coupled to the load(s) 235 via a path 245.

The power supply device 205 includes a standby monitor 265 that listens for an external wakeup command and notifies the controller 230 to unblock the path 240.

The power supply device 205 includes a monitoring element 250 that monitors a voltage level of the power supply device 205, if the voltage level falls below a threshold level, a controller 230 blocks the path 240 and unblocks the path 245.

Once path 245 is unblocked, the controller 230 monitors the power source 215 and sends an indication when the power source 215 is low.

In view of FIGS. 3-6, it should be understood that at least one example embodiment is directed to a power supply device 305 including a primary power source 310 having a first terminal. The power supply device 305 may include a first pair of blocking elements 320A/320B including a second terminal and a third terminal. The primary power source 310 is coupled to the load(s) 335 via a primary path 340. The backup power source 315 is coupled to the load(s) 335 via a path 345.

The power supply device 305 includes a standby monitor 365 that listens for an external wakeup command and notifies the ECU 330 to turn on the primary path 340.

The power supply device 305 includes a Zener diode 350 that monitors the voltage level of the power supply device 305, if the voltage level falls below a threshold level the fast switch connected to the Zener diode in element 350 unblocks a backup path 345, and automatically blocks the primary path 340.

Once backup path 345 is unblocked, the ECU 330 monitors the backup power source 315 and sends an indication when the backup power source 315 is low.

For example, when the voltage level is above a threshold level, the controller 330 controls the first set of back-to-back blocking elements 320A/320B to maintain the connection of the primary power source 310 to the load(s) 335. For example, the controller 330 controls the path 340 to be unblocked.

In another example, when the voltage level is below the threshold level, the fast switch 350 turns on backup path 345 and disconnects the primary power source 310 from the load(s) 335; the controller 330 controls the path 340 to be blocked and the path 345 to be unblocked.

Here, it should be appreciated that the method of FIG. 4 relates to the use of at least two back-to-back blocking elements to provide fail operational power to vehicle 100. For example, in an over-discharge failure mode, the back-to-back blocking elements provide a solution that allows the primary power source to disconnect from the load(s) 335 and the backup power source 315 to be connected to the load(s) 335 over a separate path from the primary power source 310.

Although example embodiments have been discussed with reference to specific voltage/current values, it should be understood that example embodiments are not limited thereto. For example, example embodiments may also be applied to vehicle systems that charge/operate at different voltages/currents than those specifically referenced herein. Furthermore, the same architecture/configuration may be implemented with different components at different voltages and/or power levels.

Aspects of example embodiments include that the voltage level dropping below the threshold value is a result of the primary power source turning off.

Aspects of example embodiments include that the voltage level dropping below the threshold value is a result of the primary power source being low.

Aspects of example embodiments include an ECU and a Zener diode that monitors the voltage level of the power supply device.

Aspects of example embodiments include a standby monitor that detects the vehicle in a standby mode is turned on.

Aspects of example embodiments include that the ECU turns on a blocking element in the primary path and turns off a blocking element in the backup path.

Aspects of example embodiments include each of at least two back-to-back blocking elements comprise a forward blocking element and a reverse blocking element.

Aspects of example embodiments include that the at least two back-to-back blocking elements comprise two pairs of back-to-back MOSFETs.

Example embodiments include a method of operating a power supply device for a vehicle, the method comprising using a primary path to connect a primary power source to one or more loads and using a backup path to connect a backup power source to the one or more loads, wherein the primary power source is not connected to the backup power source. Monitoring a voltage level of the power supply device, and if the voltage level drops below a threshold value, blocking the primary path and unblocking the backup path.

Aspects of example embodiments include that the voltage level dropping below the threshold value comprises the primary power source turning off.

Aspects of example embodiments include detecting the vehicle transitioning from a standby mode to an on mode.

Aspects of example embodiments include turning on a primary blocking element in the primary path and turning off a backup blocking element in the backup path.

Aspects of example embodiments include a pair of back-to-back blocking elements, wherein the back-to-back blocking elements include a forward blocking element and a reverse blocking element.

Aspects of example embodiments include that the back-to-back blocking elements comprise two pairs of back-to-back MOSFETs.

Example embodiments include a power supply system that a power supply device, a pair of blocking elements, a simple voltage monitor connected to a fast switch device, and an electronic control unit (ECU). The power supply device includes a primary power source connected to one or more loads via a primary path, and a backup power source connected to the one or more loads via a backup path. The primary power source is not connected to the backup power source. One of the pair of blocking elements is in the primary path and another of the pair of blocking elements is in the backup path. The simple voltage monitor element monitors the voltage level of the power supply device, and if the voltage level drops below a threshold value, the fast switch blocks the primary path and unblocks the backup path; the ECU monitors the voltage level as well as other system health-related parameters, and can maintain the block/unblock or override the fast switch based on system conditions.

Any one or more of the aspects/embodiments as substantially disclosed herein.

Any one or more of the aspects/embodiments as substantially disclosed herein optionally in combination with any one or more other aspects/embodiments as substantially disclosed herein.

One or more means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

What is claimed is:

1. A power supply device for a vehicle, comprising:
   a low-power voltage monitor coupled to a fast switch device;
   an electronic control unit (ECU), wherein a dedicated low current path powers a monitor Integrated Circuit (IC) in the ECU;
   at least a primary power source and a backup power source, wherein a primary path connects the primary power source to one or more loads, a backup path connects the backup power source to the one or more loads, and the primary power source is not connected to the backup power source;
      at least two back-to-back blocking elements, wherein one of the at least two back-to-back blocking elements is in the primary path and another of the at least two back-to-back blocking elements is in the backup path; and
   the low-power voltage monitor monitors a voltage level of the power supply device, and if the monitored voltage level drops below a threshold value, then the fast switch device blocks the primary path and unblocks the backup path.

2. The power supply device of claim 1, wherein the monitored voltage level dropping below the threshold value is a result of the primary power source turning off.

3. The power supply device of claim 1, wherein the monitored voltage level dropping below the threshold value is a result of the primary power source being low.

4. The power supply device of claim 1, wherein the ECU includes a Zener diode that monitors the monitored voltage level of the power supply device.

5. The power supply device of claim 1, further comprising:
   a standby monitor to detect the vehicle in a standby mode is turned on.

6. The power supply device of claim 1, wherein the ECU turns on a blocking element in the primary path and turns off a blocking element in the backup path.

7. The power supply device of claim 1, wherein each of the at least two back-to-back blocking elements comprise a forward blocking element and a reverse blocking element.

8. The power supply device of claim 1, wherein the at least two back-to-back blocking elements comprise two pairs of back-to-back MOSFETs.

9. The power supply device of claim 1, further comprising:
   the ECU monitoring the voltage level and overall system conditions; and
   the ECU may override the fast switch device based on the overall system conditions.

10. A method of operating a power supply device for a vehicle, the method comprising:
    using a primary path to connect a primary power source to one or more loads and using a backup path to connect a backup power source to the one or more loads, wherein the primary power source is not connected to the backup power source;
    monitoring a voltage level of the power supply device, and if the monitored voltage level drops below a threshold value, blocking the primary path and unblocking the backup path; and
    using a dedicated low current path to power a monitor Integrated Circuit (IC) in an electronic control unit (ECU).

11. The method of claim 10, wherein the monitored voltage level dropping below the threshold value comprises the primary power source turning off.

12. The method of claim 10, wherein the monitored voltage level dropping below the threshold value comprises the primary power source being low.

13. The method of claim 10, further comprising:
    detecting the vehicle transitioning from a standby mode to an on mode.

14. The method of claim 10, wherein blocking the primary path and unblocking the backup path comprises turning on a primary blocking element in the primary path and turning off a backup blocking element in the backup path.

15. The method of claim 14, wherein the primary blocking element and the backup blocking element each comprise back-to-back blocking elements, wherein the back-to-back blocking elements include a forward blocking element and a reverse blocking element.

16. The method of claim 15, wherein the back-to-back blocking elements comprise two pairs of back-to-back MOSFETs.

17. A power supply system, comprising:
a power supply device comprising:
an electronic control unit (ECU), wherein a dedicated low current path powers a monitor Integrated Circuit (IC) in the ECU;
a primary power source connected to one or more loads via a primary path;
a backup power source connected to the one or more loads via a backup path, wherein the primary power source is not connected to the backup power source;
a pair of blocking elements, wherein one of the pair of blocking elements is in the primary path and another of the pair of blocking elements is in the backup path; and
a low-power voltage sensor coupled to a fast switch device, wherein the low-power voltage sensor monitors a voltage level of the power supply device, and when the monitored voltage level drops below a threshold value, the fast switch device blocks the primary path and unblocks the backup path.

18. The power supply system of claim 17, further comprising:
a standby monitor that detects a transition from a standby mode to an on mode.

19. The power supply system of claim 17, wherein the pair of blocking elements comprise a pair of back-to-back MOSFETs.

20. The power supply system of 17, wherein the ECU monitors the voltage level and overall system conditions and may override the fast switch device based on the overall system conditions.

* * * * *